(12) United States Patent
Quincke

(10) Patent No.: US 6,345,231 B2
(45) Date of Patent: *Feb. 5, 2002

(54) METHOD AND APPARATUS FOR POSITION DETERMINING

(75) Inventor: Gunnar Quincke, Soest (DE)

(73) Assignee: CLAAS Selbstfahrende Erntemaschinen GmbH, Harsewinkel (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/349,562

(22) Filed: Jul. 8, 1999

(30) Foreign Application Priority Data

Jul. 10, 1998 (DE) .......................................... 197 30 858

(51) Int. Cl.$^7$ .......................... A01D 45/00; G01C 21/00
(52) U.S. Cl. ...................... 701/213; 37/348; 56/10.2 A
(58) Field of Search ................................ 701/213, 214, 701/215, 216; 37/348, 382; 172/2, 4.5; 56/10.2 A, 10.2 F (56) References Cited

U.S. PATENT DOCUMENTS

| | | | |
|---|---|---|---|
| 5,430,654 A | 7/1995 | Kyrtsos et al. | 364/449 |
| 5,493,499 A | * 2/1996 | Theurer et al. | 364/449 |
| 5,612,864 A | * 3/1997 | Henderson | 364/167.01 |
| 5,862,501 A | * 1/1999 | Talbot et al. | 701/50 |
| 5,877,723 A | * 3/1999 | Fan | 342/357 |
| 5,944,764 A | * 8/1999 | Henderson et al. | 701/50 |
| 5,987,371 A | * 11/1999 | Bailey et al. | 701/50 |
| 5,991,694 A | * 11/1999 | Gudat et al. | 702/2 |

FOREIGN PATENT DOCUMENTS

| | | |
|---|---|---|
| DE | 24 55 836 C3 | 8/1976 |
| DE | 43 18 798 A1 | 6/1994 |
| DE | 43 22 293 A1 | 1/1995 |
| DE | 195 36 601 A1 | 3/1997 |
| DE | 195 45 704 A1 | 6/1997 |
| DE | 197 43 884 A1 | 4/1999 |
| GB | 1 582 415 | 3/1978 |

\* cited by examiner

Primary Examiner—Tan Nguyen
Assistant Examiner—Dalena Tran
(74) Attorney, Agent, or Firm—Husch & Eppenberger, LLC; Robert E. Muir (57) ABSTRACT

The invention describes a device and a method for finding an actual or a virtual reference point on mobile equipment or implement. In agricultural technology the control and mapping of working processes as a function of the instantaneous position of the equipment on the field is gaining more and more importance. With increasing precision of the navigation systems, further possible applications are opening up. As a result of the higher precision of satellite navigation systems, the changes in inclination and direction of the equipment also have an effect on the measured position of the equipment. This effect is of the order of magnitude of the precision of modern-day navigation equipment and is therefore also taken into consideration in position finding according to the invention. For this the inclinations and direction of the machine referred to a predefined neutral position are determined and also calculated when finding any reference position. With the aid of the invention the exact position values of the navigation antenna can be converted to a reference point, which is important for the working process. This reference point is located outside the unit of mobile equipment. In an advantageous embodiment, when determining the position of the reference point, further working parameters such as speeds or positions of implements are taken into consideration or the position of the reference point is regulated with the aid of dynamic parameters such as for example the speed of travel.

29 Claims, 10 Drawing Sheets

Fig. 9
Position of the Reference Point (Virtual Position) At a Speed of Travel $V_0$

Fig. 10
Position of the Reference Point (Virtual Position) At a Speed of Travel $1.5\, V_0$

Fig. 12

METHOD AND APPARATUS FOR POSITION DETERMINING

BACKGROUND OF THE INVENTION

The invention relates generally to mobile equipment, and more particularly to such equipment having a satellite reception unit and method for position finding.

The use of satellite navigation systems, for example, the global positioning system (GPS), is already known with agricultural equipment or with implements for drawing up crop registers and ground height profiles as well as monitoring fertilizer dispensing. In this case meanwhile satellite navigation systems such as differential global positioning (DGPS) are available with suitably efficient evaluation units which achieve accuracy of position finding, i.e., finding the position of a GPS antenna, to within a centimeter.

Thus, for example, from DE 196 47 523 is known an agricultural equipment with a satellite navigation system. The equipment described therein has a cultivation tool, it being proposed therein to find the position of a reference point on the cultivation tool instead of, for example, the position of the center of the equipment. There is a problem here, however, if the satellite reception unit (GPS antenna) for particular reasons cannot be mounted on the reference point of the cultivation tool. Lack of mechanical mounting facilities, shading of signals by the equipment itself, or the risk of damage or heavy wear are possible reasons for the fact that the GPS antenna cannot be mounted directly in the location whose position is actually to be found. In these cases the reference point whose position is to be found is at a distance spatially from the GPS antenna whose position is actually found by the satellite navigation system. This makes coordinate conversion necessary; i.e., from the coordinates found by satellite navigation of the GPS antenna which is, for example, located on top of the equipment, the coordinates of the reference point on the cultivation tool, which might be lower than the antenna, must be deduced by conversion. In the event that the cultivation tool is rigidly connected to the equipment, from DE 196 47 523 is obtained the instruction for finding the height coordinate of the reference point; subtract the difference in height between the mounting point of the GPS antenna and the reference point of the height-coordinate of the mounting point of the GPS antenna determined by satellite navigation for conversion. In the event that the cultivation tool is not rigidly connected to the equipment, but, for example, mounted on it with adjustable height, from DE 196 47 523 is obtained the instruction to provide a sensor which measures the change in height of the cultivation tool relative to the equipment and lets this measured change in height enter into the coordinate finding described above as a correction.

Furthermore, however, there is a general problem of position finding if the location (reference point) whose position is to be found does not coincide with the mounting point of the GPS antenna, but there is a distance between the two. And of course there is an uncertainty which stems from the fact that basically all points on the surface of a sphere with a radius of that distance, at the center of which is located the mounting point of the GPS antenna, are considered as the possible positions of the reference point. As the distance between the reference point and the GPS antenna in the case of agricultural equipment can perfectly well be several meters, the result is a correspondingly high uncertainty in position finding of the reference point, which is in itself highly unsatisfactory in view of more and more accurate navigation systems.

Of course the direction of travel and the orientation of the equipment can be determined by iteration while traveling from the position coordinates of the GPS antenna succeeding each other in time, but this method is inaccurate and fails in the case of equipment that is stationary or when starting from a standstill. Furthermore, the direction of travel does not tally with the longitudinal direction of the equipment in some applications (for example, in crab steering or on a slope).

Only if one were to make restrictions on freedom of movement—for instance, only travel in a N-S and/or E-W direction or only travel in the horizontal plane—could this uncertainty be avoided. This is, however, not possible with agricultural equipment and implements hitched to them.

It is an object of the present invention to reliably allow accurate finding of a reference point which is spatially remote from the mounting point of the navigation antenna.

SUMMARY OF THE INVENTION

In accordance with the present invention there is provided a satellite antenna attached to an item of equipment and capable of receiving global positioning system transmissions, at least one sensor with the capability to determine three-dimensional distance from the satellite antenna to a reference point, and a processing unit capable of calculating the location of the reference point using the location of the satellite antenna and the distance information from the sensor.

In accordance with another aspect of the present invention is a method for position finding in the three-dimensional terrestrial reference system. The absolute position of a satellite reception unit is determined, and then at least one sensor is used to determine the distance between the satellite reception unit and a reference point spatially separated from it. Equipment-specific base conversion quantities in memory accessible to the processing unit are then used to determine with a processing unit and the data received by the satellite reception unit the absolute position of the reference point.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

A piece of agricultural equipment 20 comprises at least one sensor S, S1, S2, S3 for finding the position of the equipment. Here, "position" means the alignment of the equipment and the orientation in the horizontal plane of the terrestrial reference system (x,y,z). Alignment means the angle ($\phi$) which the longitudinal direction of the equipment forms, for example, with the N-S direction (y-coordinate of the terrestrial reference system). Orientation means the direction in which, for example, the front of the equipment points. But the position of the equipment also means the longitudinal ($\alpha$) or transverse ($\beta$) inclination of the equipment relative to the vertical direction (Z-coordinate) of the reference system. The coordinates of a GPS antenna 22 are referred to as ($X_A$, $Y_A$, $Z_A$); the coordinates of a reference point 24 as ($X_P$, $Y_P$, $Z_P$).

Preferably a mechanical gyro compass or a laser gyro known to one skilled in the art is used as the sensor for finding the alignment ($\phi$) of the equipment 20 in the horizontal plane. Preferably perpendicular pendulums with electrical signal generators which are also known to one skilled in the art are used as the sensors for the longitudinal ($\alpha$) or transverse ($\beta$) inclination. One skilled in the art can also make use of a single sensor which is capable of detecting the various deviations ($\phi$, $\alpha$, $\beta$).

Further, according to the embodiment of the invention, equipment-specific base conversion quantities ($X_{P0}-X_{A0}$; $Y_{P0}-Y_{A0}$; $Z_{P0}-Z_{A0}$; $\phi_0$; $\alpha_0$; $\beta_0$; $d_1$, $d_2$, $d_3$) are provided which reflect the geometrical ratios of the arrangement of the reference point and GPS antenna 22 on the equipment 20 for a given, aligned position of the equipment. The aligned position of the equipment selected is preferably the one in which the longitudinal direction of the equipment is aligned in a N-S direction with the front facing north and in which there is no longitudinal or transverse inclination of the equipment, i.e., for the particular position it is assumed that the equipment is standing on a level field not sloping in any direction. These base conversion quantities are, so to speak, part of an equipment specification. In detail they are ($X_{P0}-X_{A0}$) the difference between the x-coordinates of reference point and location of the GPS antenna 22, ($Y_{P0}-Y_{A0}$) the corresponding difference between the y-coordinates, ($Z_{P0}-Z_{A0}$) the corresponding difference between the z-coordinates, $d_1$ the projection of the distance (D; distance from the location of the GPS antenna 22 to the reference point 24) onto the horizontal plane (x,y) of the reference system, $d_2$ the projection of the distance (D; distance from the location of the GPS antenna to the reference point) onto the y,z-plane of the reference system, $d_3$ the projection of the distance (D; distance from the location of the GPS antenna 22 to the reference point 24) onto the horizontal x,z-plane of the reference system, $\phi_0$ the angle between $d_1$ and the N-S direction (x-direction), $\alpha_0$ the angle between $d_2$ and the vertical of the reference system (z-direction), $\beta_0$ the angle between $d_3$ and the vertical of the reference system (z-direction).

As an illustration, the agricultural equipment 20 with an imaginary, fixed, Cartesian coordinate system referred to the equipment can be defined. The axes of this coordinate system are referred to as (bx, by, bz). The origin of coordinates (zero point) of this coordinate system is placed at the location of the GPS antenna 22. Here it is critical that this coordinate system is rigidly connected to the equipment, i.e., all horizontal and vertical changes of location as well as all turning and tilting of the equipment apply to this coordinate system.

In the aligned position:
the coordinate axis (bx) of this coordinate system is parallel to the W-E direction (x-coordinate axis of terrestrial reference system),
the coordinate axis (by) of this coordinate system is parallel to the N-S direction (y-coordinate axis of terrestrial reference system),
the coordinate axis (bz) of this coordinate system is parallel to the vertical (z-coordinate axis of terrestrial reference system).

The equipment-specific base conversion quantities ($X_{P0}-X_{A0}$; $Y_{P0}-Y_{A0}$; $Z_{P0}-Z_{A0}$; $\phi_0$; $\alpha_0$; $\beta_0$; $d_1$, $d_2$; $d_3$) is stored in a memory of a processing unit AWE or in another memory to which the processing unit has access. The processing unit may be any type of commercially available processor capable of making the necessary calculations and storing the result in memory.

According to the embodiment of the invention the sensor or sensors S, S1, S2, S3 each detect a deviation ($\phi$, $\alpha$, $\beta$) of the equipment position from the aligned position which is described in detail above. The processing unit AWE then determines with the aid of these deviations ($\phi$, $\alpha$, $\beta$) and by taking into account the equipment-specific base conversion quantities ($\phi_0$; $\alpha_0$; $\beta_0$; $d_1$; $d_2$; $d_3$) in each case the current conversion quantity for finding the coordinates ($X_A$, $Y_A$, $Z_A$) of the reference point. The reference point 24 is a distance from the satellite reception unit (i.e. GPS antenna 22) located at position coordinates ($X_P$, $Y_P$, $Z_P$).

The absolute position for the location of the GPS antenna 22 is found by a computing algorithm known in the art, which processes the transmitted data of GPS satellites. This is known to one skilled in the art and can be done with sufficient precision. The satellite reception unit (GPS antenna 22) can already include a processing unit (not shown) which from the GPS transmitted data already determines position data for the location of the GPS antenna, from which the position of the reference point is then found in this processing unit or in a separate processing unit AWE. It is also within the scope of the invention, however, if only one processing unit which does not belong directly to the satellite reception unit is provided, the GPS transmitted data for position finding of the location of the GPS antenna also being transmitted to this processing unit.

In a preferred embodiment of the invention, a transformation matrix is calculated from the conversion quantities respectively found according to the invention, and with this transformation matrix the position vector ($X_P$, $Y_P$, $Z_P$) of the reference point to be found is determined from the known position vector ($X_A$, $Y_A$, $Z_A$) of the GPS antenna 22.

The relevance of the present embodiment will be illustrated by the concrete example of a combine harvester 20 which is moving in a S-N direction up a slope inclined by 15% ($\alpha$=8.50). The equipment-specific base conversions referred to the aligned position (as described above) of the combine harvester are a GPS antenna 22 on the top of the combine harvester at a height of 4 m above the ground, reference point 24 on a cutterbar 26, this being 1 m above the ground, i.e. $\Delta Z0=-3$ m, also $\Delta X0=-3.5$ m and $\Delta Y0=-5$ m.

Without taking the inclination of the slope into account according to the invention, for example according to DE 196 47 523 only the changing position of the GPS antenna 22 would be measured and for position finding of the reference point $\Delta Z0=3$ m would always be subtracted from the changing z-coordinate of the GPS antenna and also $\Delta Y0=5$ m would always be added to the changing y-coordinate of the GPS antenna. This does not, however, match the reality; in actual fact the differences are dependent on the inclination of the slope. In this case for accurately finding the reference point a difference of $\Delta Z=2.23$ m would have to be subtracted from the z-coordinate of the GPS antenna and a difference of $\Delta Y=5.39$ m would have to be subtracted from the y-coordinate of the GPS antenna. Hence, position finding according to the state of the art differs by 77 cm for the z-coordinate and by 39 cm for the y-coordinate from the actual value. These deviations are greater than the inaccuracy of satellite navigation itself.

A detailed deduction of these quantities is given below with reference to the drawings.

The embodiment of the invention allows accurate position finding of a reference point 24 which is spatially at a distance from the GPS antenna 22, this being for the most varied positions of an agricultural equipment 20 or implement in the terrestrial reference system. Thus crop registers and ground height profiles can be drawn up much more accurately.

The embodiment of the invention also provides a particular improvement for automatic steering systems, so that, for example, the combine harvester 20 can automatically be steered along a virtual corn edge. The virtual corn edge is derived from previously recorded reference position data and compared with the measured current reference position of the edge of the cutterbar 26. From the deviations of equipment direction and the distance from the reference point 24, an adjusting signal for the automatic steering system is determined.

The embodiment of the invention brings a further advantage for the control of distributing equipment which is suitable for dispensing agents, for example sprays or fertilizers, on fields. By means of a virtual position, automatic working width regulation can be constructed very easily. The position data of the cutting boundaries or cutting regions which are not to be supplied with agents are now prepared according to the working process before dispensing the agents and transmitted to the implement control system. If the reference point 24 is placed at the location of the outermost dispensing position, the working width can be reduced accordingly if the reference point oversteps the stored cutting boundaries and be adapted dynamically to the path of the cutting boundaries. By recording the reference points, a virtual cultivation edge at which equipment can be automatically steered along with the aid of the current working width the next time it moves along can be recorded here, too. If further reference points are placed, for example in the direction of working, at the beginning or end of the dispensing region, switching the implement on or off can be carried out easily.

The invention can also be used advantageously on agricultural equipment combinations (e.g. FIG. 11) such as a tractor 30 with an implement such as, for example, a hitched drawn fertilizer spreader 32 or a sprayer which can be uncoupled from the satellite reception antenna in direction or inclination. Then additional own inclination or direction sensors are mounted on the implements, determining the alignment of the implement advantageously at the point of coupling to the tractor. The basic distance (D) between the virtual reference point and the reception antenna 22 is then composed of individual partial distances which are specific to the respective implement and the traction machine and can be calculated advantageously via a predefined coupling point between traction machine and implement.

Figure 1:
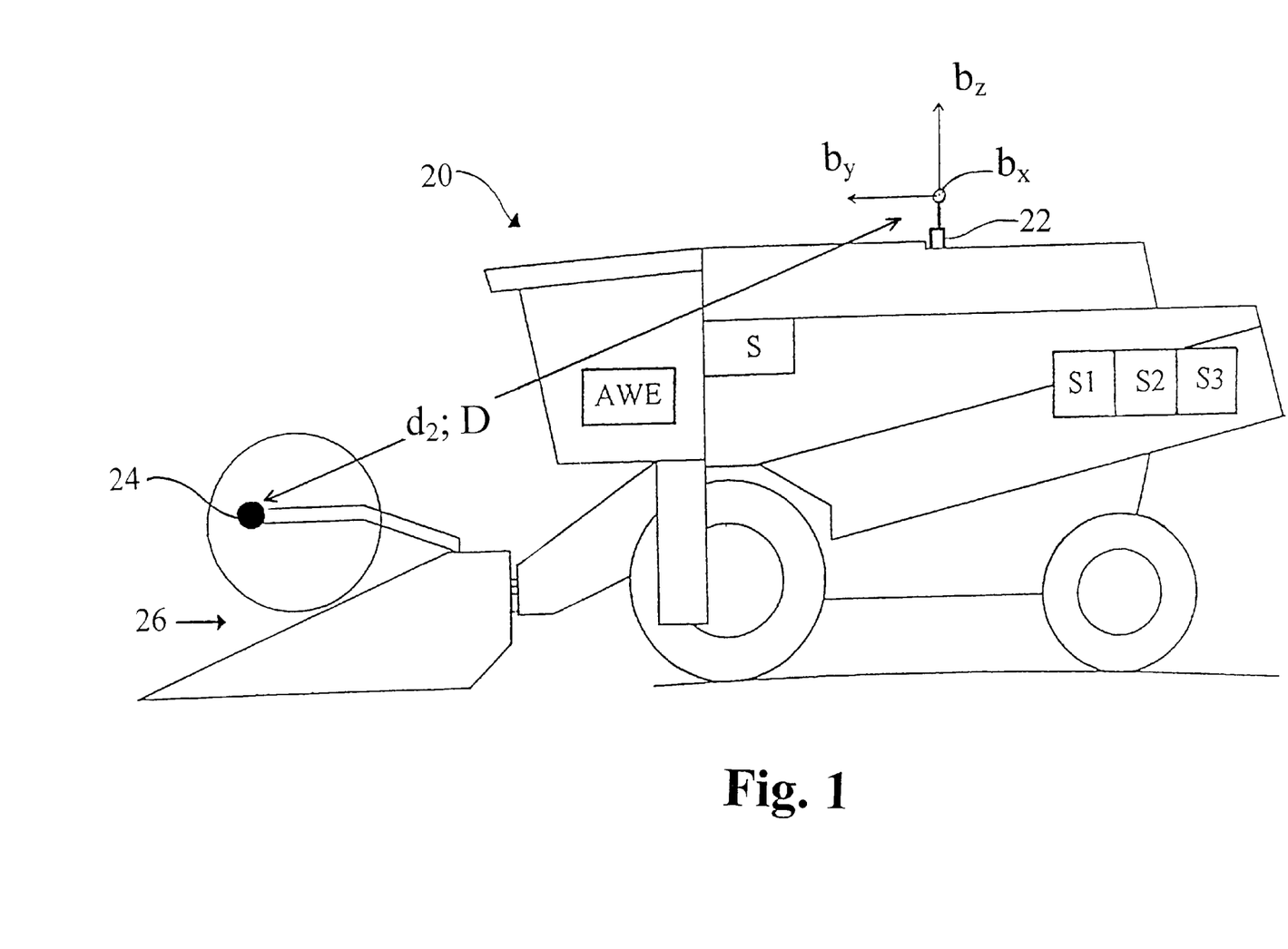
FIG. 1 is a view, partly diagrammatic and partly a side view, of a combine harvester having a GPS antenna on its top and a mounted cutterbar at the front on which the reference point is located.

FIG. 1 shows the combine harvester 20 with hitched cutterbar 26. The GPS antenna 22 is located on the top of the combine harvester at a height above the ground of about 4 m. The reference point is placed on the outside of the cutterbar at a height of 1 m above the ground. This side view shows the combine harvester in the yz-plane of the terrestrial coordinate system. Also shown is the imaginary coordinate system rigidly connected to the combine harvester (bx, by, bz). The distance between the location of the GPS antenna and the reference point is marked with the reference symbol (D). In this side view, however, only the projection ($d_2$) of the distance line (D) onto the yz-plane can be shown.

Figure 2:
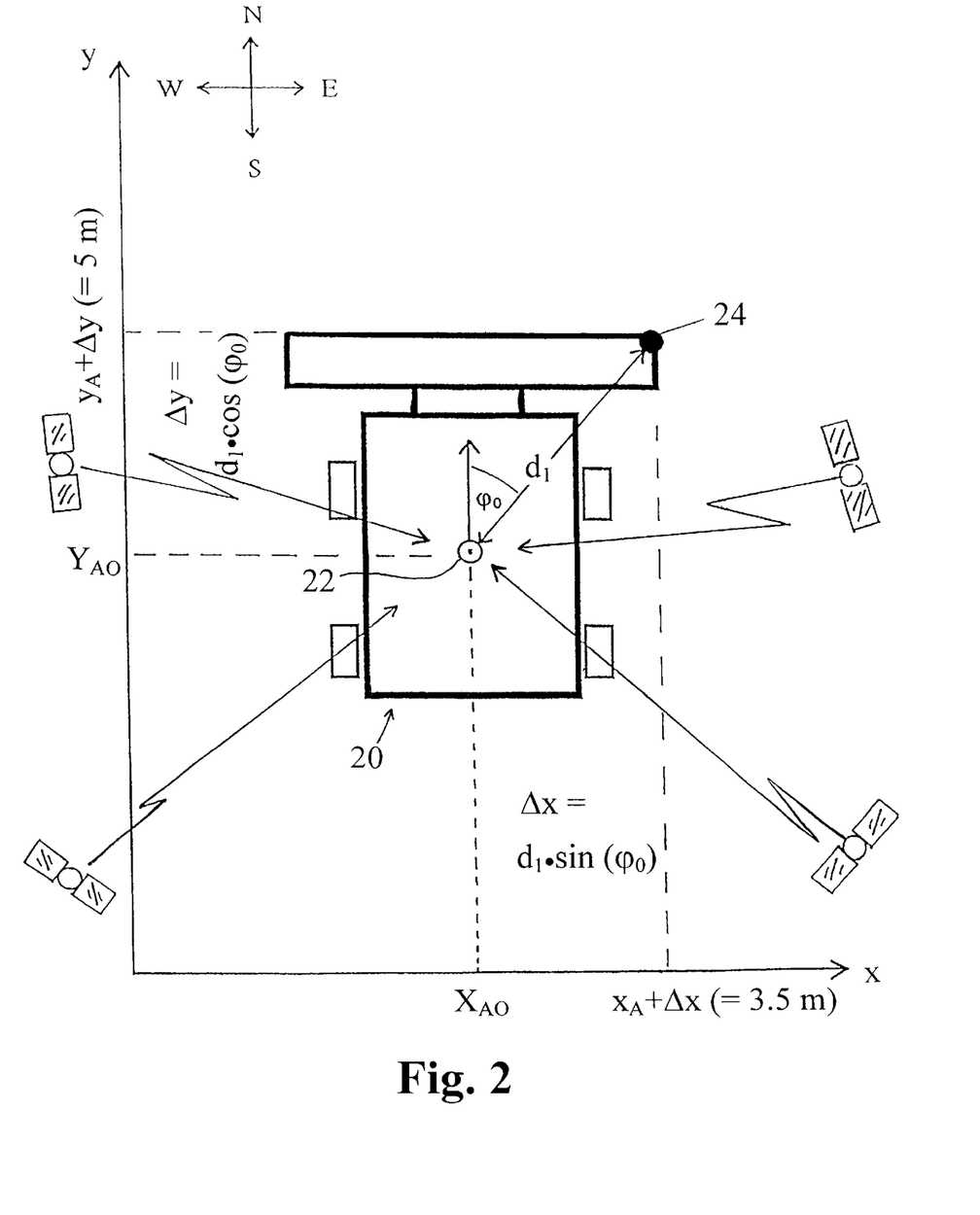
FIG. 2 is a schematic top view of the horizontal plane with a combine harvester, aligned in the neutral position with the longitudinal direction to the north.
Figure 4:
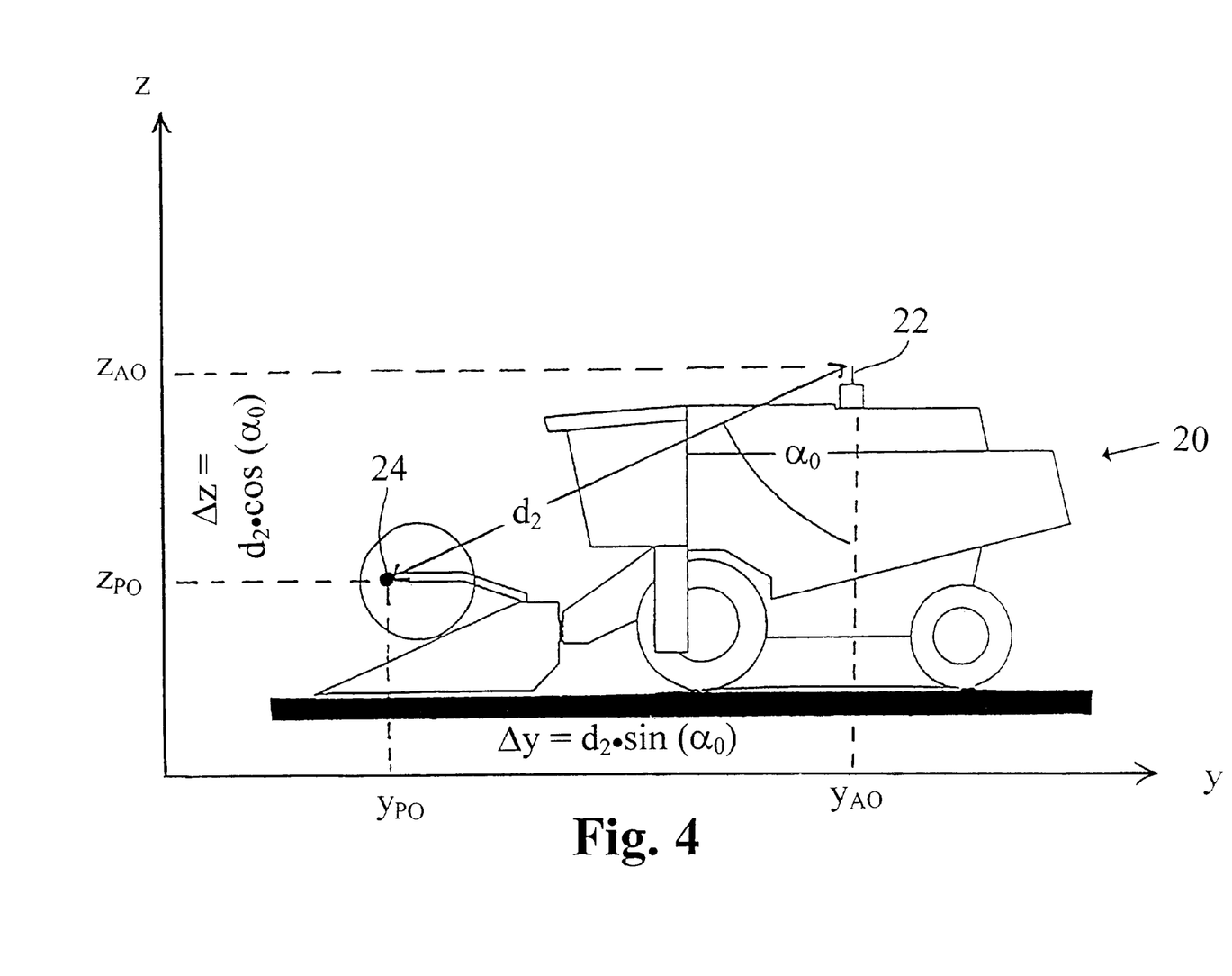
FIG. 4 is a schematic side view with the combine harvester in the yz-plane in an aligned neutral position.
Figure 6:
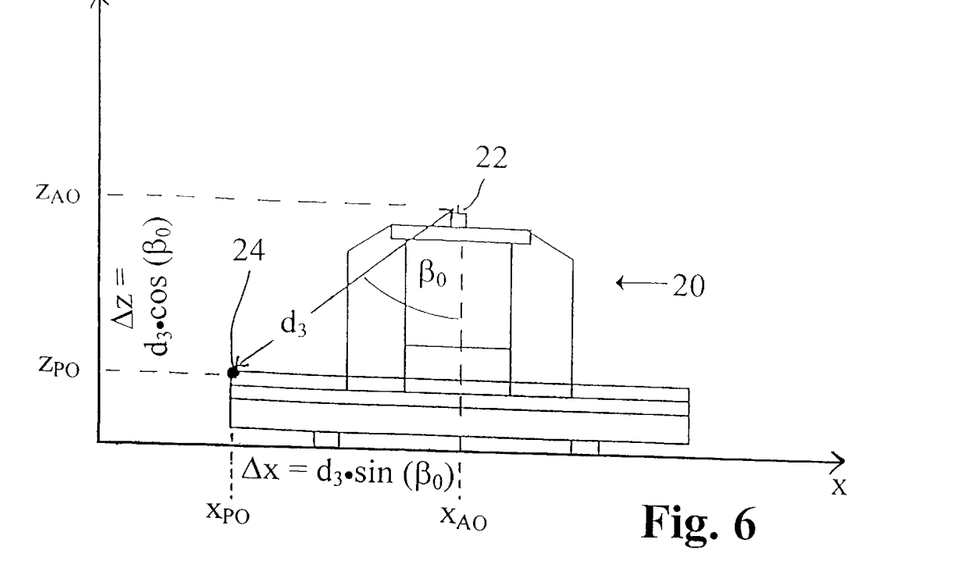
FIG. 6 is a schematic side view with the combine harvester in the xz-plane in an aligned neutral position.

In FIGS. 2, 4, 6 the combine harvester 20 is shown in each case in an aligned neutral position in the associated plane. The views are schematic and not to scale.

FIG. 2 shows the top view of a combine harvester 20 in an aligned neutral position. The GPS antenna 22 is located on the top of the combine harvester. For illustration four GPS satellites are also shown, from which the GPS antenna can receive satellite navigation signals. The position shown is selected so that the longitudinal direction of the equipment is parallel to the N-S direction (y-coordinate) and the cutterbar is facing north. Of course a different position can be selected within the scope of the invention. The choice of this position for easy determination of the equipment-specific base conversion quantities is merely a convenience. The aligned position should be chosen, however, taking into account conventions of the satellite navigation system used, in such a way that determination of the base conversion quantities is as easy as possible. The base conversion quantities are referred to as "equipment-specific" because, when the aligned position is once fixed by convention, they can be determined unambiguously by the location of the GPS antenna 22 on the equipment 20 and the desired position of the reference point 24 for this "equipment-specific" configuration. The base conversion quantities can be determined by measurement and/or mathematical calculations.

In the example shown in FIG. 2 the difference ($X_{P0}-X_{A0}$) between the x-coordinate of the reference point 24 and the x-coordinate of the GPS antenna 22 is equal to 3.5 m; the difference ($Y_{P0}-Y_{A0}$) between the y-coordinate of the reference point and the y-coordinate of the GPS antenna is equal to 5 m.

$d_1$ is the projection of the distance line (D) between GPS antenna and reference point onto the horizontal plane (x,y). The same also applies to $d_2$ and $d_3$ in relation to the respective planes.

$$D = \sqrt{(3,5^2 + 5^2 + 3^2)m^2} = 6,8m$$

$$d_1 = \sqrt{(3,5^2 + 5^2)m^2} = 6,1m$$

$\phi_0$ denotes the angle between $d_1$ and the N-S direction/longitudinal direction of the equipment 20.

$\phi_0$ is found from:

$$\tan(\phi_0) = \tan(3.5/5) \Rightarrow \phi_0 = 35°.$$

$\phi_0$ and $d_1$ can, like $\alpha_0$, $\beta_0$, $d_2$ and $d_3$, be used as equipment-specific base conversion quantities.

FIG. 4 shows the side view (yz-plane) of the combine harvester 20 in the aligned position. The GPS antenna 22 is located on the roof of the combine harvester at a height of 4 m, and the reference point 24 on the cutterbar 26 at a height of 1 m. The difference $(Y_{P0}-Y_{A0})$ between the y-coordinate of the reference point and the y-coordinate of the GPS antenna, as can already be seen from FIG. 2, is equal to 5 m; the difference $(Z_{P0}-Z_{A0})$ between the z-coordinate of the reference point and the z-coordinate of the GPS antenna is equal to −3 m.

$$d_2 = \sqrt{(3^2+5^2)m^2} = 5,83m$$

$\alpha_0$ denotes the angle between $d_2$ and the vertical/z-direction.

$\alpha_0$ is found from:

$$\tan(\alpha_0) = \tan(5/3) \rightarrow \alpha_0 = 59°.$$

FIG. 6 shows the side view (x,z-plane) of the combine harvester 20 in the aligned position. The GPS antenna 22 is located on the top of the combine harvester at a height of 4 m, and the reference point 24 on the cutterbar 26 at a height of 1 m. The difference $(X_{P0}-X_{A0})$ between the x-coordinate of the reference point and the x-coordinate of the GPS antenna, as can already be seen from FIG. 2, is equal to 3.5 m; the difference $(Z_{P0}-Z_{A0})$ between the z-coordinate of the reference point and the z-coordinate of the GPS antenna is equal to −3 m.

$$d_3 = \sqrt{(3^2+3,5^2)m^2} = 4,61m$$

$\beta_0$ denotes the angle between $d_3$ and the vertical/z-direction.

$\beta_0$ is found from:

$$\tan(\beta_0) = \tan(3.5/3) \rightarrow \beta_0 = 49.4°.$$

During use of the combine harvester 20 the deviations ($\phi$, $\alpha$, $\beta$) are measured and according to the embodiment of the invention using the base conversion quantities described above in each case current conversion quantities are determined for finding the reference point 24.

Figure 3:
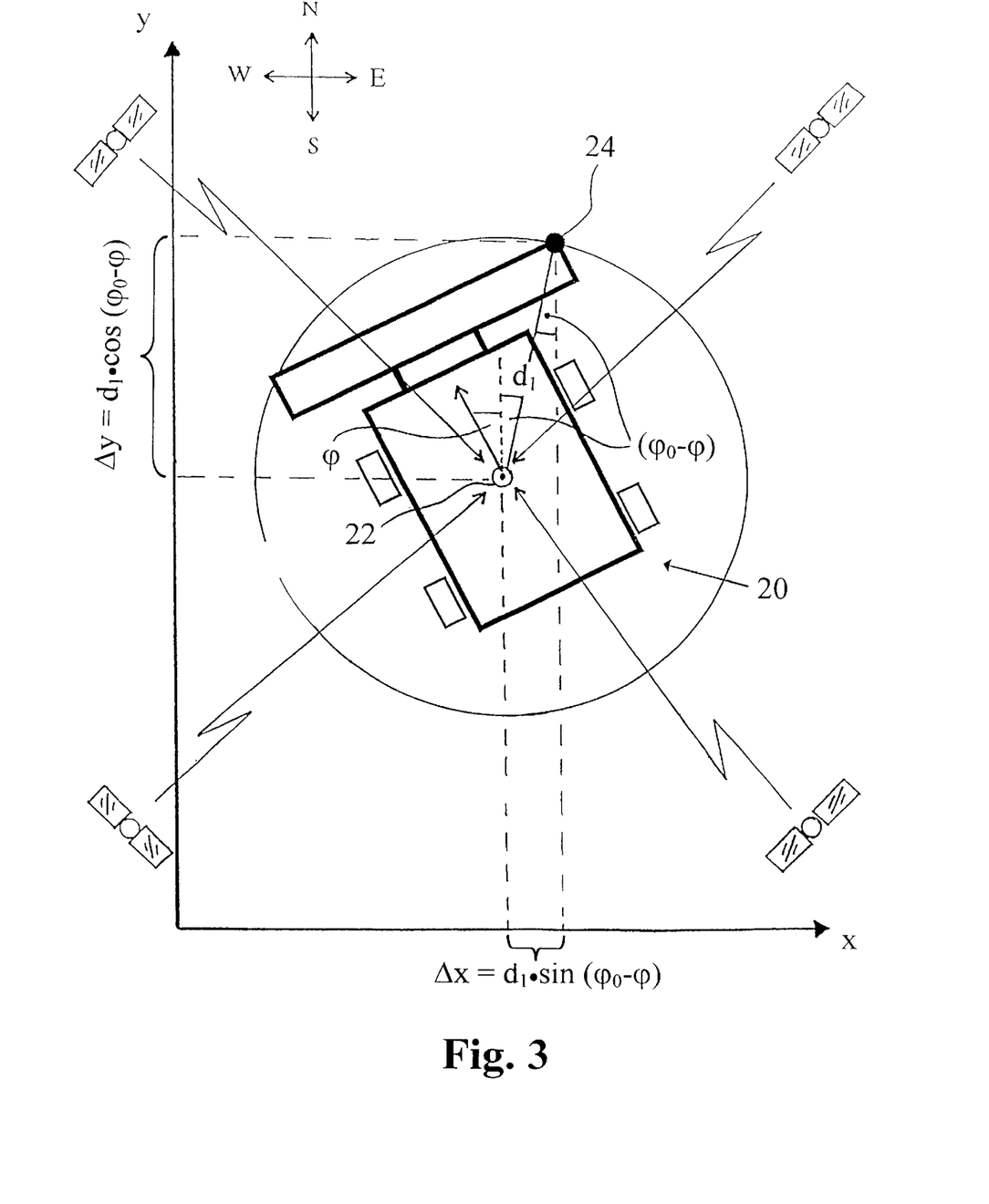
FIG. 3 is as FIG. 2, but the combine harvester is turned relative to the aligned position on the horizontal plane.

FIG. 3 shows the top view of a combine harvester 20 deviating from the aligned position on a level field. The corresponding conversion quantities are:

$$\Delta X = d_1 \sin(\phi_0-\phi)$$

and $$\Delta Y = d_1 \cos(\phi_0-\phi)$$

Figure 5:
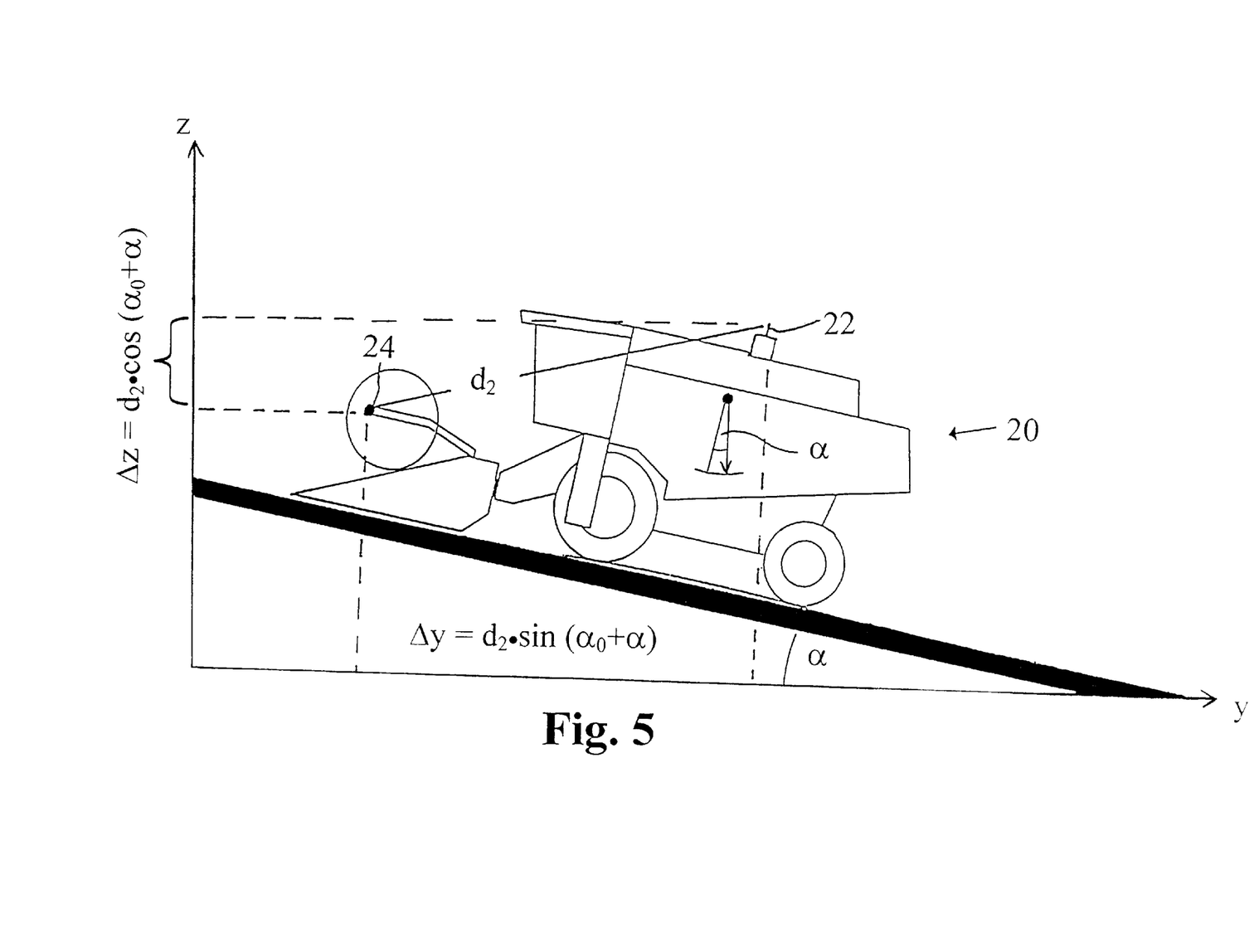
FIG. 5 is as FIG. 4, but the combine harvester is turned relative to the aligned position in the yz-plane.

FIG. 5 shows a side view of a combine harvester 20 deviating from the aligned position, which is going up a slope in a S-N direction. The corresponding conversion quantities are:

$$\Delta Y = d_2 \sin(\alpha_0-\alpha)$$

and $$\Delta Z = d_2 \cos(\alpha_0-\alpha).$$

A slope with a 15% incline ($\alpha$=8.5°) then yields the values given at the beginning:

$$\Delta Y = 5.39 \text{ m}$$

and $$\Delta Z = 2.23 \text{ m}.$$

Figure 7:
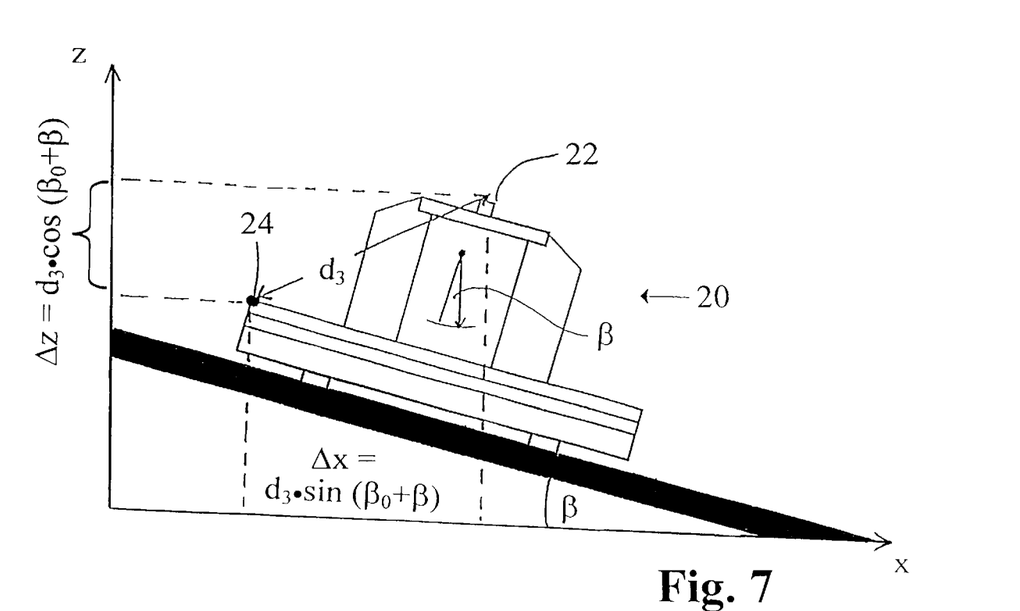
FIG. 7 is as FIG. 6, but the combine harvester is turned relative to the marked position in the xz-plane.

FIG. 7 shows a front view of a combine harvester 20 deviating from the aligned position in a S-N direction, which is inclined along a slope in an E-W direction. The corresponding conversion quantities are:

$$\Delta X = d_3 \sin(\beta_0-\beta)$$

and $$\Delta Z = d_3 \cos(\beta_0-\beta).$$

Below, the examples described above are shown in vector and matrix notation, which is solved mathematically.

General Coordinate Transformation

Finding the position vector $(X_P, Y_P, Z_P)$ of the reference point 24 from the position vector $(X_A, Y_A, Z_A)$ of the GPS antenna 22 and the transformation matrix with the matrix elements $(a_{ij})$ as well as the unit vector (1,1,1) in the Cartesian terrestrial coordinate system:

$$\begin{bmatrix} X_P \\ Y_P \\ Z_P \end{bmatrix} = \begin{bmatrix} X_A \\ Y_A \\ Z_A \end{bmatrix} + \begin{bmatrix} a_{11} & a_{12} & a_{13} \\ a_{21} & a_{22} & a_{23} \\ a_{31} & a_{32} & a_{33} \end{bmatrix} \begin{bmatrix} 1 \\ 1 \\ 1 \end{bmatrix}$$

$$\begin{bmatrix} X_P \\ Y_P \\ Z_P \end{bmatrix} = \begin{bmatrix} X_A + a_{11} + a_{12} + a_{13} \\ Y_A + a_{21} + a_{22} + a_{23} \\ Z_A + a_{31} + a_{32} + a_{33} \end{bmatrix}$$

Coordinate Transformation for the Particular Position (N-S Alignment, No Inclination)

$$\begin{bmatrix} X_P \\ Y_P \\ Z_P \end{bmatrix} = \begin{bmatrix} X_A + 3,5 \\ Y_A + 5 \\ Z_A - 3 \end{bmatrix}$$

Traveling in the Horizontal Plane (cf. FIG. 3)

$$\begin{bmatrix} X_P \\ Y_P \\ Z_P \end{bmatrix} = \begin{bmatrix} X_A \\ Y_A \\ Z_A \end{bmatrix} + \begin{bmatrix} d_1\sin(\varphi_0-\varphi) & 0 & 0 \\ 0 & d_1\cos(\varphi_0-\varphi) & 0 \\ 0 & 0 & -3 \end{bmatrix} \begin{bmatrix} 1 \\ 1 \\ 1 \end{bmatrix}$$

$$\begin{bmatrix} X_P \\ Y_P \\ Z_P \end{bmatrix} = \begin{bmatrix} X_A + d_1\sin(\varphi_0-\varphi) \\ Y_A + d_1\cos(\varphi_0-\varphi) \\ Z_A - 3 \end{bmatrix}$$

Traveling in the N-S Direction on a Slope Inclined in the Direction of Travel (cf. FIG. 5)

$$\begin{bmatrix} X_P \\ Y_P \\ Z_P \end{bmatrix} = \begin{bmatrix} X_A \\ Y_A \\ Z_A \end{bmatrix} + \begin{bmatrix} 3,5 & 0 & 0 \\ 0 & d_2\sin(\alpha_0+\alpha) & 0 \\ 0 & 0 & -d_2\cos(\alpha_0+\alpha) \end{bmatrix} \begin{bmatrix} 1 \\ 1 \\ 1 \end{bmatrix}$$

-continued $$\begin{bmatrix} X_p \\ Y_p \\ Z_p \end{bmatrix} = \begin{bmatrix} X_A + 3, 5 \\ Y_A + d_2\sin(\alpha_0 + \alpha) \\ Z_A - d_2\cos(\alpha_0 + \alpha) \end{bmatrix}$$

Traveling in the N-S Direction on a Slope Inclined Transversely to the Longitudinal Direction of the Equipment (cf. FIG. 7)

$$\begin{bmatrix} X_p \\ Y_p \\ Z_p \end{bmatrix} = \begin{bmatrix} X_A \\ Y_A \\ Z_A \end{bmatrix} + \begin{bmatrix} d_3\sin(\beta_0 + \beta) & 0 & 0 \\ 0 & 5 & 0 \\ 0 & 0 & -d_3\cos(\beta_0 + \beta) \end{bmatrix} \begin{bmatrix} 1 \\ 1 \\ 1 \end{bmatrix}$$

$$\begin{bmatrix} X_p \\ Y_p \\ Z_p \end{bmatrix} = \begin{bmatrix} X_A + d_3\sin(\beta_0 + \beta) \\ Y_A + 5 \\ Z_A - d_3\cos(\beta_0 + \beta) \end{bmatrix}$$

The invention is, as already mentioned above, not confined to finding one reference point 24. On the contrary, it is quite possible for two or more reference points to be provided. These can be located within the equipment 20 instead of on the tool, such as the cutterbar 26. Furthermore, it is provided that the reference point or points as virtual reference points are located outside the equipment and outside the attached tool.

Figure 8:
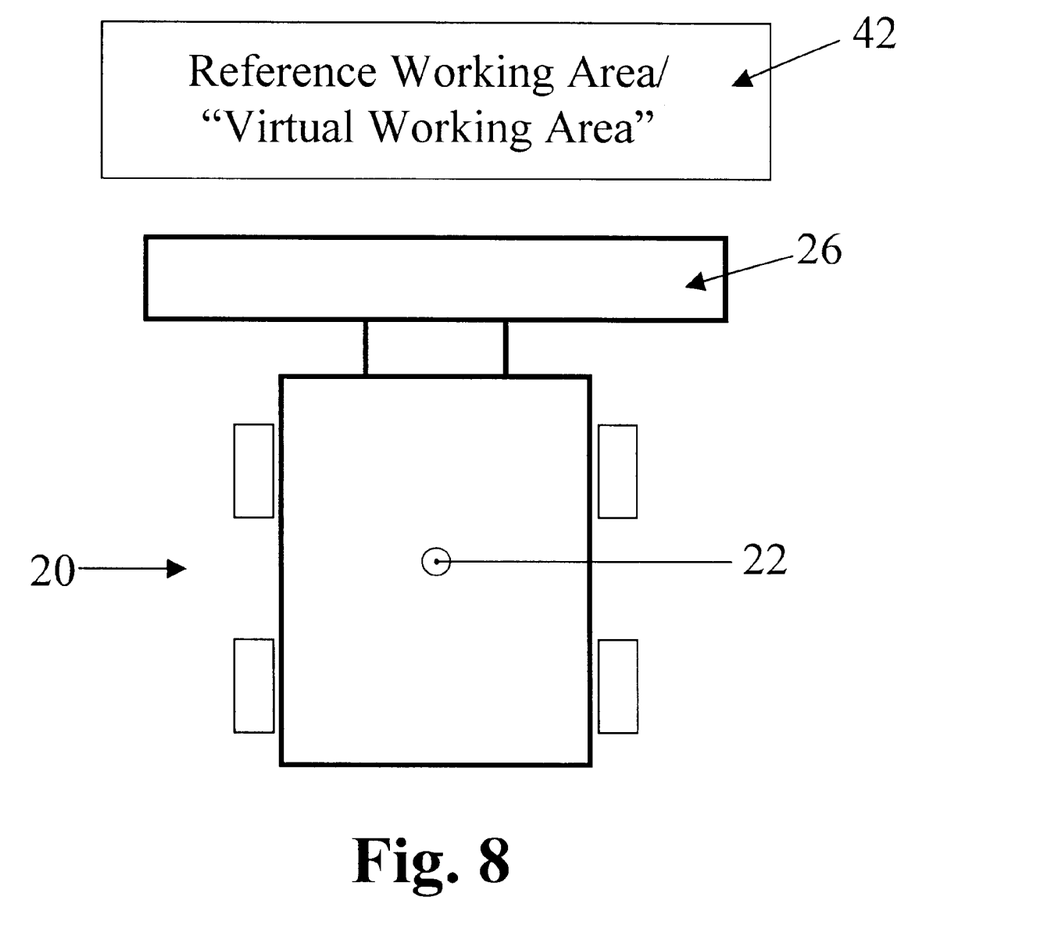
FIG. 8 is a schematic top view of a combine harvester with a virtual working area located in front of the cutterbar.

Also according to the invention it is provided that a reference line, reference area, or reference volume consisting of two or more reference points can be found. FIG. 8 shows such a virtual reference area 42 in front of the cutterbar 26.

Figure 9:
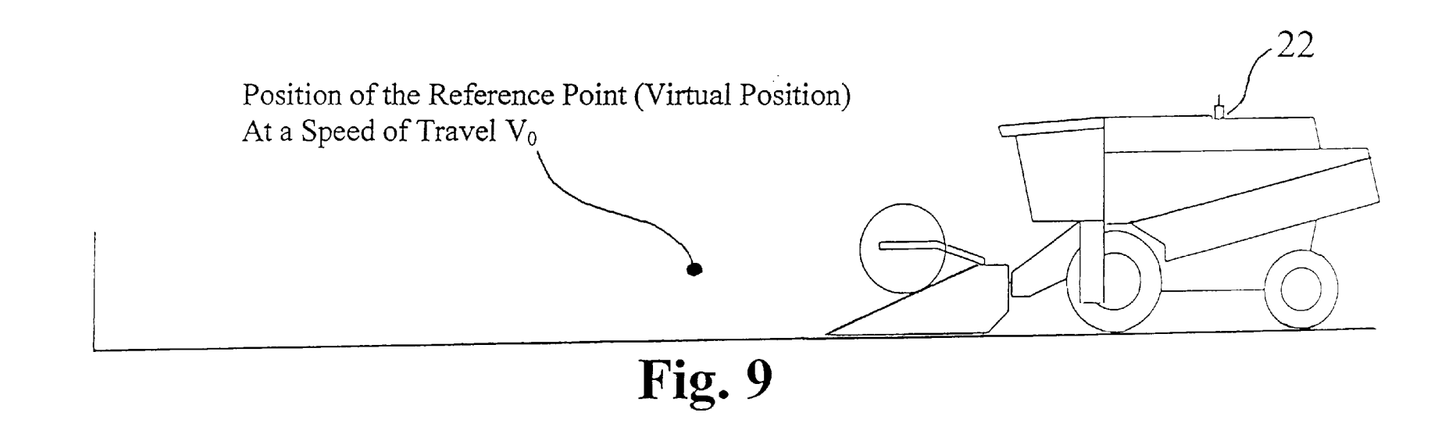
FIG. 9 is a side view of a combine harvester with a virtual reference point located in front of the cutterbar.
Figure 10:
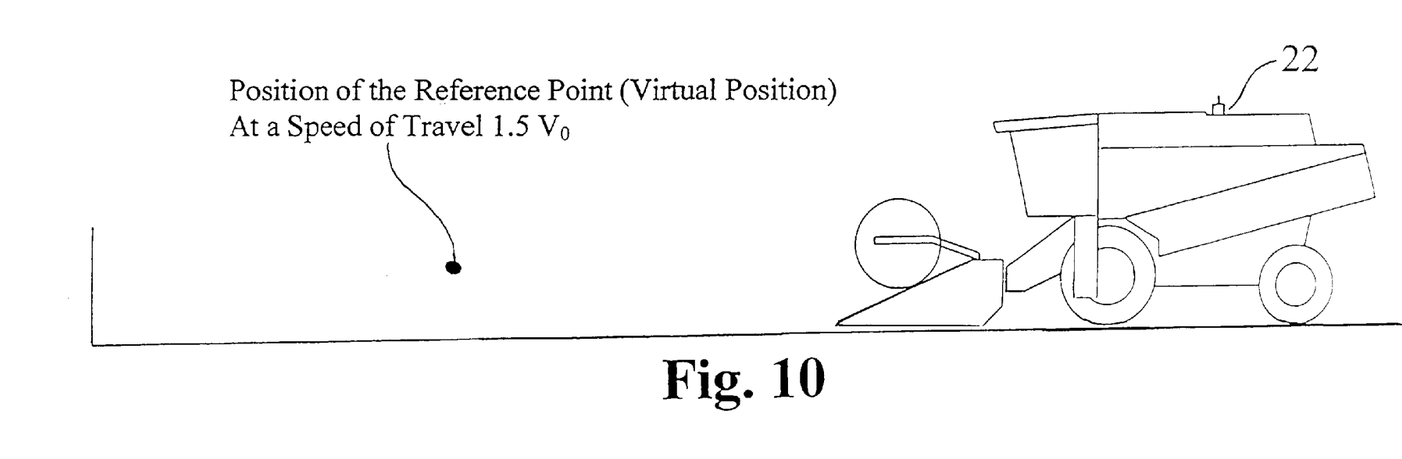
FIG. 10 is as in FIG. 9, with the reference point located further in front of the cutterbar.

Furthermore, it is provided that when the processing unit AWE finds a virtual reference point 40, it takes into consideration at least one parameter of the equipment 20, such as the speed of travel, so that the position of the virtual reference point relative to the satellite reception unit (GPS antenna) can be regulated dynamically as a function of at least one parameter. This is shown with reference to the speed of travel in FIGS. 9 and 10. It is thus possible to travel at a higher speed in this way, looking further ahead, so to speak.

Furthermore, it is provided that whenever the reference point, which is ahead in the direction of travel, has reached the end of the field (which can be determined with a stored field register, for example) certain operations (e.g., lifting cutterbar 26, lifting and turning plow) are triggered automatically with an adjustable time lag.

Figure 11:
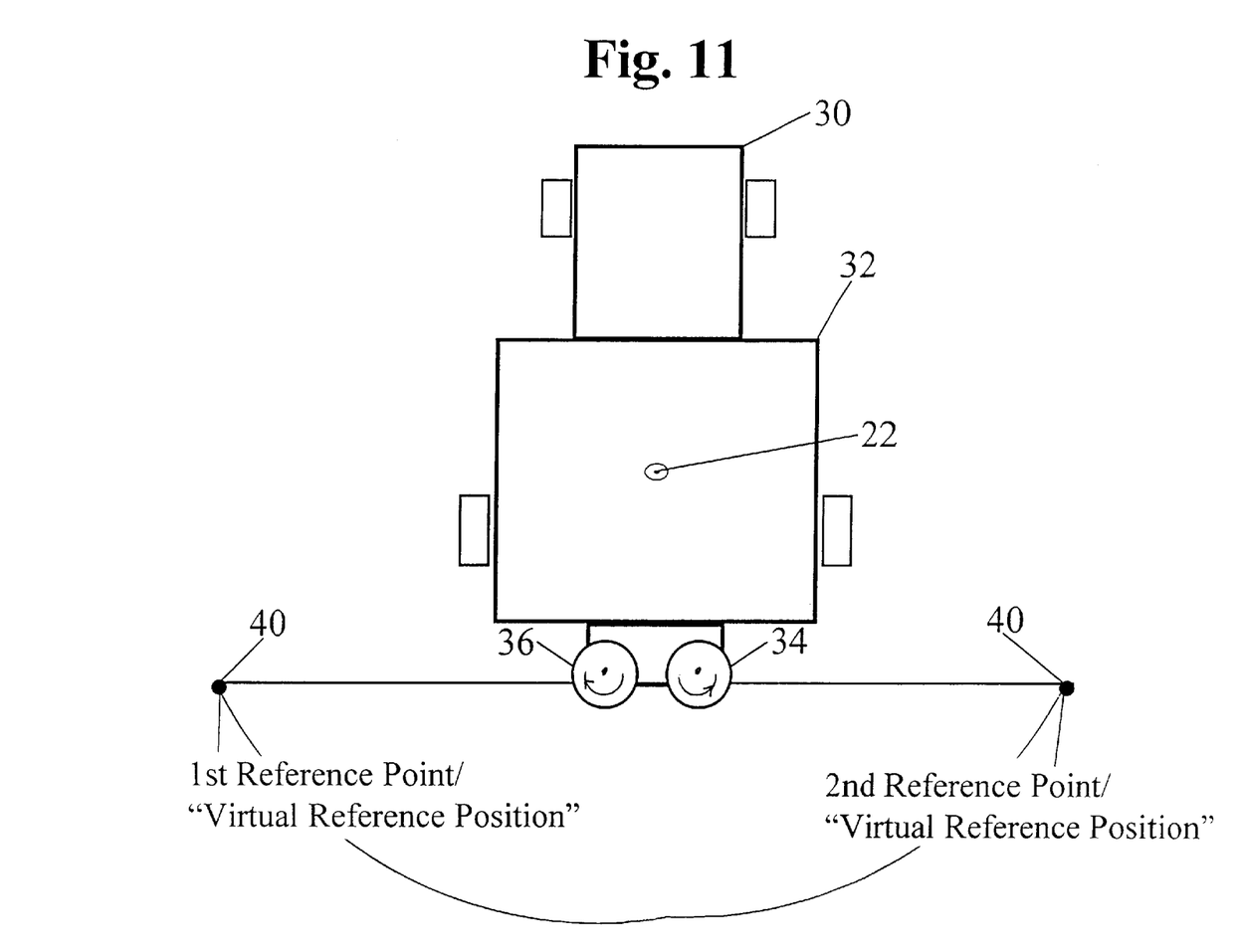
FIG. 11 is a schematic top view of a tractor with a fertilizer spreader mounted by the three-point hitch and two virtual reference points.
Figure 12:
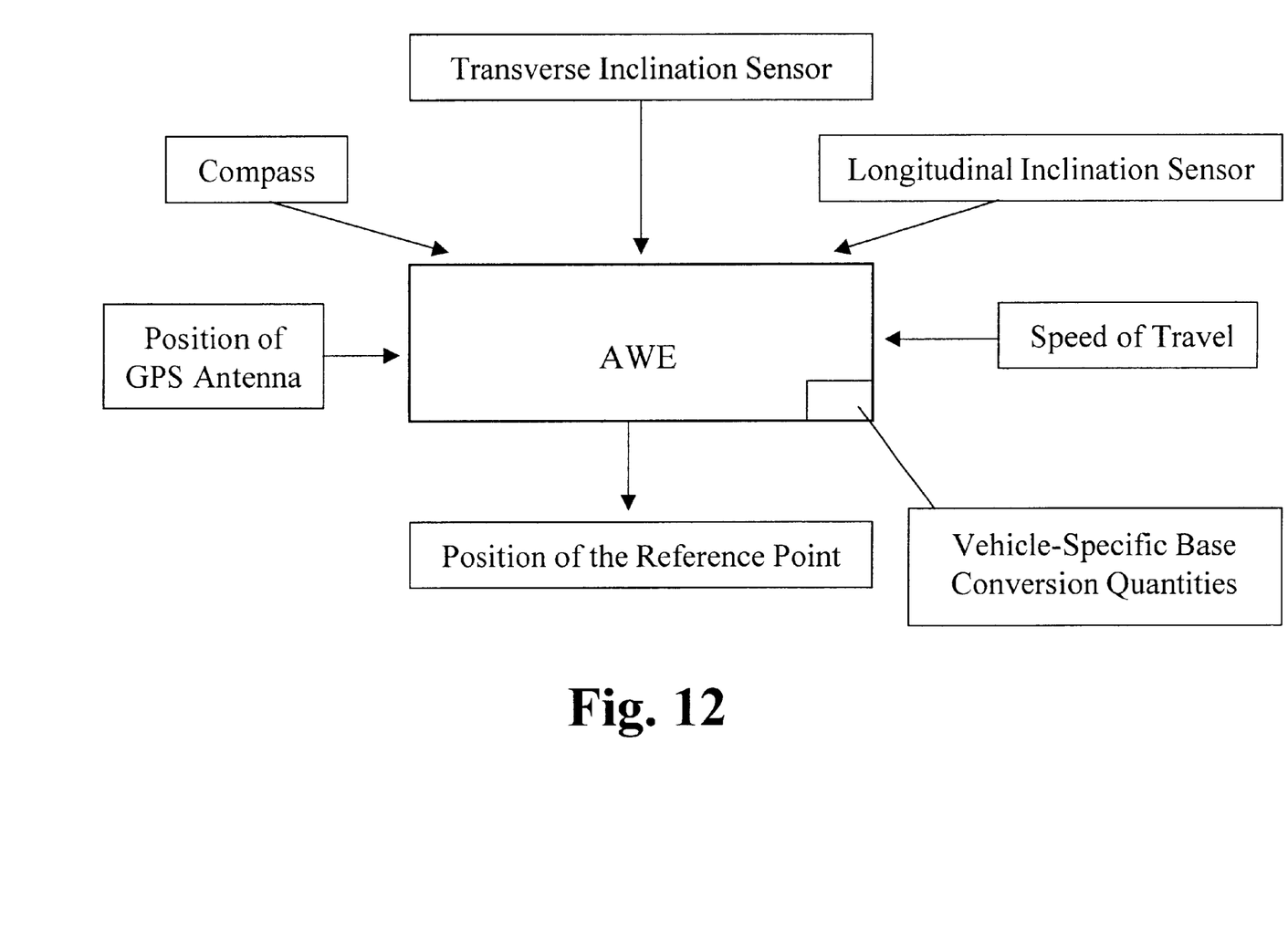
FIG. 12 is a block diagram with the evaluation unit and the various sensors.

Further, it is provided that at least one position parameter (relative angle of bending of the trailer to the tractor, relative height of a three-point hitch, relative feeder housing angle, etc.) of a cultivation tool mounted on the equipment is taken into consideration by the processing unit AWE, so that the position of the virtual reference point 40 relative to the satellite reception unit (GPS antenna 22) can be regulated dynamically as a function of this parameter as shown in FIG. 12. In FIG. 11, for example, is shown a tractor 30 with a fertilizer spreader 32. Here it is provided that the position of the virtual reference point is made dependent on the speed of rotation of the spreader plates 34, 36 or the working width of the spreader, so that the reference point 40 is in each case located at the edge of the spreading range. In order that the theoretical working width can be determined even more accurately, the position parameters of the three-point hitch are also taken into consideration when calculating the reference point.

In the case of a fertilizer spreader 32 with several spreader plates 34, 36, if necessary, several corresponding reference points 40 may exist; individual reference points are capable of being deactivated and reactivated by the operator of the equipment. This is perfectly sensible in the case shown with two spreader plates 34, 36 if, for example, when traveling at the edge of the field the speed of the spreader plate on the edge side is first reduced and then shut off, in which case position finding of the corresponding reference point then also becomes superfluous and possibly even a nuisance. By including further parameters from the working process such as, for example, the speed of travel or fertilizer-specific quantities, the working width of the spreader can be controlled in such a way that even the flight time of the product being spread is taken into consideration as well (for example, for selection of the correct moment to switch the dispensing device on and off).

In summary, the method for position finding in the three-dimensional terrestrial reference system comprises the steps of: (a) determining the absolute position in the three-dimensional terrestrial reference system using a satellite reception unit; (b) determining the distance between the satellite reception unit and a reference point spatially separate from the location of the satellite reception unit using at least one sensor; (c) storing equipment-specific base conversion quantities in memory accessible by the processing unit; and (d) determining the absolute position of the reference point with a processing unit and the data received by the satellite reception unit. The method advantageously includes determining a transformation matrix from the equipment-specific conversion quantities, whereby it can determine the position vector of the reference point from the known position vector of the satellite reception unit.

The invention has been described here with reference to a combine harvester 20 and to a hitched fertilizer spreader 32. It is, however, also clear to one skilled in the art that it can also be used in other commercial equipment such as construction machinery which works or converts a ground contour, and it is also applicable to easily hitched implements which have their own navigation equipment. Accordingly, the invention in its broader aspects is not limited to the specific steps and apparatus shown and described, but departures may be made therefrom within the scope of the accompanying claims without departing from the principles of the invention and without sacrificing its chief advantages.

I claim:

1. In a unit of equipment having a satellite reception unit capable of receiving global positioning system transmissions and means for determining a precise position thereof, the improvement comprising:
    (a) means including at least one sensor associated with the equipment for determining a three-dimensional distance from the satellite reception unit to a spaced reference point that is located outside the unit of equipment; and
    (b) a processing unit for calculating the position of the spaced reference point using the position of the satellite reception unit and the distance information from the sensor.

2. A unit of equipment according to claim 1, wherein the processing unit determines a transformation matrix, and with this transformation matrix determines a position vector of the reference point from the known position vector of the satellite reception unit.

3. A unit of equipment according to claim 1, wherein the sensor is a direction sensor whereby the alignment of the equipment in the horizontal plane of a terrestrial reference system is found.

4. A unit of equipment according to claim 1 wherein the sensor is an inclination sensor whereby the longitudinal inclination of the equipment is found relative to a vertical direction of a terrestrial reference system.

5. A unit of equipment according to claim 1 wherein the sensor is an inclination sensor whereby the transverse inclination of the equipment relative is found relative to a vertical direction of a terrestrial reference system.

6. A unit of equipment according to claim 1 wherein the sensor is a sensor that determines the alignment of the equipment in the horizontal plane of a terrestrial reference system as well as the longitudinal inclination of the equipment relative to the vertical direction of a terrestrial reference system.

7. A unit of equipment according to claim 1, wherein a reference line consisting of at least two reference points, located outside the unit of equipment, can be found.

8. A unit of equipment according to claim 1, wherein a reference area consisting of at least three reference points, located outside the unit of equipment, can be found.

9. A unit of equipment according to claim 1, wherein a reference volume consisting of at least four reference points, located outside the unit of equipment, can be found.

10. A unit of equipment according to claim 1, wherein at least one working parameter of an implement attached to the equipment is taken into consideration by the processing unit, whereby the position of the reference point, located outside the unit of equipment, relative to the satellite reception unit can be calculated as a function of the working parameter.

11. A unit of equipment according to claim 1, including means for determining the speed of travel of the unit, and wherein the processing unit takes into consideration speed of travel of the equipment when finding a virtual reference point, located outside the unit of equipment, whereby the position of the virtual reference point relative to the satellite reception unit can be regulated dynamically as a function of the speed of travel.

12. A unit of equipment according to claim 1, wherein individual reference points, located outside the unit of equipment, are capable of being controlled by the operator of the equipment.

13. A unit of equipment according to claim 1, wherein individual reference points, located outside the unit of equipment, are capable of being controlled automatically by the working process.

14. In agricultural equipment having a satellite reception unit for position finding in the three-dimensional terrestrial reference system, and a processing unit which from the data received by the satellite reception unit determines the absolute position of at least one reference point, located outside the unit of equipment, which is spatially separate from the location of the satellite reception unit, the spatial distance between the satellite reception unit and the reference point being known in value, the improvement comprising:

at least one sensor for finding the position of the equipment i.e., alignment and orientation of the equipment in the horizontal plane of the terrestrial reference system and/or the longitudinal or transverse inclination of the equipment relative to the vertical direction of the reference system, in a memory of the processing unit for a given marked position of the equipment—preferably longitudinal direction of the equipment in the N-S direction with the front facing north and without longitudinal or transverse inclination of the equipment—at least one equipment-specific base conversion quantity $(X_{P0}-X_{A0}; Y_{P0}-Y_{A0}; Z_{P0}-Z_{A0}; \phi_0; \alpha_0; \beta_0; d_1, d_2; d_3)$ can be stored,—the sensor(s) detecting at least one deviation $(\phi, \alpha, \beta)$ of the position from the aligned neutral position, and the processing unit with the aid of this deviation $(\phi, \alpha, \beta)$ and taking into account at least one equipment-specific base conversion quantity $(\phi_0; \alpha_0; \beta_0; d_1, d_2; d_3)$ in each case determining the current conversion quantity for finding the coordinates $(X_A, Y_A, Z_A)$ of the reference point, located outside the unit of equipment, which is spatially at a distance from the satellite reception unit, from the known position coordinates $(X_P, Y_P, Z_P)$ of the satellite reception unit.

15. A method for position finding in the three-dimensional terrestrial reference system comprising:

(a) determining the absolute position in the three-dimensional terrestrial reference system using a satellite reception unit;

(b) determining the distance between the satellite reception unit and a reference point, located outside the unit of equipment, spatially separate from the location of the satellite reception unit using at least one sensor;

(c) storing equipment-specific base conversion quantities in memory accessible by the processing unit; and (d) determining the absolute position of the reference point with a processing unit and the data received by the satellite reception unit.

16. A method for position finding in the three-dimensional terrestrial reference system according to claim 15, further including determining a transformation matrix from the equipment-specific conversion quantities, whereby it can determine the position vector of the reference point, located outside the unit of equipment, from the known position vector of the satellite reception unit.

17. A mobile machine having a satellite reception unit capable of receiving global positioning system transmissions and for determining a precise position thereof and an automatic steering system comprising:

at least one sensor associated with the mobile machine for determining a three-dimensional distance from the satellite reception unit to a spaced reference point that is located outside the mobile machine; and processing unit for calculating a position of the spaced reference point using the position of the satellite reception unit and the distance information from the sensor to create reference position data to form a virtual crop edge wherein the processing unit compares the reference position data that is recorded with current reference position data thereby creating an adjusting signal for the automatic steering system.

18. The mobile machine according to claim 17, wherein the mobile machine includes a cutter bar with the location of the spaced reference point is located away from an edge of the cutter bar.

19. A mobile machine having a hitch drawn implement with a satellite reception unit capable of receiving global positioning system transmissions and for determining a precise position thereof comprising:

at least one sensor mounted on the implement for determining a three-dimensional distance from the satellite reception unit to a spaced reference point that is located outside the mobile machine;

a processing unit calculating alignment of the implement at a point of coupling to the mobile machine.

20. A mobile machine having a hitch drawn implement with a satellite reception unit capable of receiving global positioning system transmissions and for determining a precise position thereof comprising:

at least one first sensor mounted on the implement for determining a three-dimensional distance from the satellite reception unit to a spaced reference point that is located outside the mobile machine;

at least one second sensor for obtaining at least one parameter; and processing unit for calculating at least one virtual reference point that is dynamically regulated based on the at least one parameter.

21. The mobile machine according to claim 20, wherein the implement is a fertilizer spreader, having spreader plates, wherein the parameter is related to a speed of the spreader plates.

22. The mobile machine according to claim 20, wherein the implement is a fertilizer spreader, having spreader plates, wherein the parameter is a flight time of fertilizer being spread by the fertilizer spreader.

23. A mobile machine having a hitch drawn implement with a satellite reception unit capable of receiving global positioning system transmissions and for determining a precise position thereof comprising:

at least one first sensor mounted on the implement for determining a three-dimensional distance from the satellite reception unit to a spaced reference point;

at least one second sensor for obtaining at least one parameter; and a processing unit for calculating at least one virtual reference point that is dynamically regulated based on the at least one parameter, wherein the at least one virtual reference point can be deactivated.

24. A mobile machine having a hitch drawn implement with a satellite reception unit capable of receiving global positioning system transmissions and for determining a precise position thereof comprising:

at least one first sensor mounted on the implement for determining a three-dimensional distance from the satellite reception unit to a spaced reference point;

at least one second sensor for obtaining at least one parameter; and a processing unit for calculating at least one virtual reference point that is dynamically regulated based on the at least one parameter, wherein the at least one deactivated virtual reference point can be reactivated.

25. The mobile machine according to claim 20, wherein the processing unit creates an adjusting signal from the dynamically regulated virtual reference point for an automatic steering system.

26. A method for receiving global positioning system transmissions and for determining a precise position thereof with mobile machine having a satellite reception unit and an automatic steering system comprising:

determining a three-dimensional distance from the satellite reception unit to a spaced reference point that is located outside the mobile machine with at least one sensor associated with the mobile machine; and calculating a position of the spaced reference point using the position of the satellite reception unit and the distance information from the sensor to create reference position data to form a virtual crop edge wherein the processing unit compares the reference position data that is recorded with current reference position data thereby creating an adjusting signal for the automatic steering system with a processor.

27. A method for receiving global positioning system transmissions and for determining a precise position thereof with a mobile machine having a hitch drawn implement with a satellite reception unit comprising:

determining a three-dimensional distance from the satellite reception unit to a spaced reference point that is located outside the mobile machine with at least one sensor mounted on the implement; and calculating alignment of the implement at a point of coupling to the mobile machine with a processing unit.

28. A method for receiving global positioning system transmissions and for determining a precise position thereof with a mobile machine having a hitch drawn implement with a satellite reception unit comprising:

determining a three-dimensional distance from the satellite reception unit to a spaced reference point that is located outside the mobile machine with at least one first sensor mounted on the implement;

obtaining at least one parameter with at least one second sensor; and calculating at least one virtual reference point that is dynamically regulated based on the at least one parameter with a processing unit.

29. The method for receiving global positioning system transmissions according to claim 28, further including creating an adjusting signal from the dynamically regulated virtual reference point for an automatic steering system with a processing unit.

* * * * *